US012629978B2

(12) United States Patent
Guest et al.

(10) Patent No.: US 12,629,978 B2
(45) Date of Patent: **\*May 19, 2026**

(54) RIDE HEIGHT CONTROL SYSTEM AND METHOD

(71) Applicant: JAGUAR LAND ROVER LIMITED, Whitley (GB)

(72) Inventors: Philip Guest, Warwick (GB); Jason Walters, Warwick (GB); Sam Anker, Coventry (GB); Edward Nicholson, Bishops Itchington (GB)

(73) Assignee: JAGUAR LAND ROVER LIMITED, Whitley (GB)

( \* ) Notice: Subject to any disclaimer, the term of this patent is extended or adjusted under 35 U.S.C. 154(b) by 148 days.

This patent is subject to a terminal disclaimer.

(21) Appl. No.: 18/595,399

(22) Filed: Mar. 4, 2024

(65) Prior Publication Data

US 2024/0343085 A1      Oct. 17, 2024

Related U.S. Application Data

(63) Continuation of application No. 17/880,545, filed on Aug. 3, 2022, now Pat. No. 11,919,354, which is a
(Continued)

(30) Foreign Application Priority Data

Mar. 14, 2013     (GB) ..................................... 1304658

(51) Int. Cl.
  *B60G 17/0165*     (2006.01)
  *B60G 17/016*     (2006.01)
(52) U.S. Cl.
  CPC ....... *B60G 17/0165* (2013.01); *B60G 17/016* (2013.01); *B60G 2300/07* (2013.01);
(Continued)

(58) Field of Classification Search
  CPC .............. B60G 17/0165; B60G 17/016; B60G 2300/07; B60G 2400/204;
(Continued)

(56) References Cited

U.S. PATENT DOCUMENTS 5,593,176 A    1/1997  Campbell et al.
6,260,860 B1   7/2001  Brookes et al.
(Continued)

FOREIGN PATENT DOCUMENTS

DE    102004029055 A1    1/2005
DE    102004017986 A1   11/2005
(Continued)

OTHER PUBLICATIONS

International Search Report for Application No. PCT/EP2014/050558, dated Mar. 27, 2014, 3 pages.
(Continued)

*Primary Examiner* — Donald J Wallace
(74) *Attorney, Agent, or Firm* — TROUTMAN PEPPER LOCKE LLP; Dustin B. Weeks; Nicholas H. Doss

(57)      ABSTRACT

The present invention relates to a control system (49) for controlling a target ride height of a vehicle (1). The control system (49) is configured to set a target off-road ride height (h$_{OFF}$) in dependence on one or more vehicle operating parameters. The target off-road ride height (h$_{OFF}$) is set upon receipt of a driving mode signal signalling that an off-road driving mode has been selected. Aspects of the present invention also relate to a vehicle and a method of controlling a target ride height of a vehicle.

17 Claims, 4 Drawing Sheets

Related U.S. Application Data continuation of application No. 14/776,264, filed as application No. PCT/EP2014/050558 on Jan. 14, 2014, now Pat. No. 11,407,269.

(52) U.S. Cl.
CPC .. *B60G 2400/204* (2013.01); *B60G 2400/302* (2013.01); *B60G 2500/30* (2013.01)

(58) Field of Classification Search
CPC ......... B60G 2400/302; B60G 2500/30; B60W 10/22; B60W 2520/10
See application file for complete search history.

(56) References Cited

U.S. PATENT DOCUMENTS

| | | | |
|---|---|---|---|
| 6,722,669 | B1 | 4/2004 | Stammreich |
| 8,075,002 | B1 | 12/2011 | Pionke |
| 11,407,269 | B2 | 8/2022 | Guest et al. |
| 11,919,354 | B2 * | 3/2024 | Guest ................. B60G 17/0165 |
| 2003/0200016 | A1 | 10/2003 | Spillane et al. |
| 2005/0004732 | A1 | 1/2005 | Berry |
| 2005/0212225 | A1 | 9/2005 | Seiki |
| 2008/0243336 | A1 | 10/2008 | Fitzgibbons |
| 2009/0062985 | A1 | 3/2009 | Ohashi et al. |
| 2009/0184480 | A1 | 7/2009 | Larsson et al. |
| 2010/0320704 | A1 | 12/2010 | Kolp et al. |
| 2011/0035105 | A1 | 2/2011 | Jolly |
| 2015/0057883 | A1 | 2/2015 | Kelly |
| 2016/0031287 | A1 | 2/2016 | Guest et al. |

FOREIGN PATENT DOCUMENTS

| | | |
|---|---|---|
| GB | 2346592 A | 8/2000 |
| GB | 2348405 A | 10/2000 |
| GB | 2494528 A | 9/2012 |
| JP | S6397411 A | 4/1988 |
| JP | H09076799 A | 3/1997 |

OTHER PUBLICATIONS

GB Combined Search and Examination Report for corresponding Application No. GB1304658.6, dated Sep. 9, 2013, 7 pages.
GB Examination Report for corresponding Application No. GB1304658.6, dated Jul. 30, 2015, 3 pages.
Notice of Opposition (Fritz) with Translation for European Application No. 14700620.9, dated Sep. 29, 2021, 54 pages.
Notice of Opposition (Audi) with Translation for European Application No. 14700620.9, dated Aug. 5, 2021, 29 pages.
Peter Wolkenstein, "The New Audi 7", ATZ, vol. 107, dated 2005, 20 pages.
Volker Marx et al., "Confident On-Road and Off-Road" M-Class Drive Train, ATZ Extra, Dec. 2011, 16 pages.
ATZ Spezial, Range Rover Driving Dynamics, Nov. 2012, 12 pages.

* cited by examiner

RIDE HEIGHT CONTROL SYSTEM AND METHOD

TECHNICAL FIELD

The present invention relates to a control system for controlling a target ride height of a vehicle; a vehicle; and a method of controlling a target vehicle ride height.

BACKGROUND OF THE INVENTION

It is known to provide off-road vehicles with an adjustable height suspension including a set of adjustable suspension units. The suspension units can comprise an air spring or the like to enable the height of the respective suspension units to be adjusted to vary the ride height of the vehicle. When the vehicle is being driven off-road the height of the suspension units can be increased to raise the vehicle ride height to provide additional ground clearance. The height of the suspension units is typically selected manually. To reduce driver workload, it is known to provide a single off-road ride height which can be selected by the driver. Other systems allow a range of heights to be selected, but this can prove confusing for the driver.

Furthermore, it is known to revert to a standard ride height when the vehicle speed exceeds a defined threshold. However, the driver may have to repeatedly select the increased ride height, for example if the off-road route encompasses sections which allow the vehicle to travel at speeds above the defined speed threshold.

At least in certain embodiments, the present invention sets out to overcome or ameliorate at least some of the shortcomings associated with prior art control units.

SUMMARY OF THE INVENTION

Aspects of the present invention relate to a control system for controlling a target ride height of a vehicle; a vehicle; and a method of controlling a target vehicle ride height.

According to a further aspect of the present invention there is provided a control system for controlling a target ride height of a vehicle, the control system being configured, upon receipt of a driving mode signal signalling that an off-road driving mode has been selected, automatically to set a target off-road ride height in dependence on one or more vehicle operating parameters. The driving mode signal is output upon selection of the off-road driving mode. The control system receives the driving mode signal and is operative automatically to set the target off-road ride height of the vehicle based on said one or more vehicle operating parameters (for example to increase or decrease the target off-road ride height). The resulting automated system can, at least in certain embodiments, provide simplified operation and help to reduce driver workload.

The control system can be suitable for controlling the ride height of the vehicle. In particular, the control system can be configured to output a suspension control signal to control the height of one or more suspension units in dependence on the target off-road ride height. The suspension control signal can adjust (or maintain) the height of one or more of said suspension units to achieve the target off-road ride height of the vehicle. The suspension control signal can, for example, control a valve assembly to adjust a mass of air in an air spring; or a hydraulic pressure in a piston. The control system can control the suspension units in unison, independently of each other, or in pairs.

A height sensor can be provided at each suspension unit and the control system can be in electronic communication with each height sensor. The control system can receive a height signal from each height sensor to determine a measured height of each suspension unit. If the measured height of a suspension unit is below the target off-road ride height, the control system can output a suspension control signal to increase the suspension height. Conversely, if the measured height of a suspension unit is above the target off-road ride height, the control system can output a suspension control signal to decrease the suspension height. The control system can operate the one or more suspension units in a self-levelling mode.

The control system can set the target off-road ride height of said vehicle in dependence on vehicle speed. The target off-road ride height can be set based on the vehicle speed at the time when the driving mode signal is received by the control system to signal selection of the off-road driving mode. In use, the off-road driving mode is selected (either automatically or manually) and the control system automatically sets the vehicle ride height based on the vehicle speed. The vehicle can thereby enter the off-road driving mode at a vehicle ride height appropriate for the current vehicle road speed. The control system can be in electronic communication with one or more velocity transducers, for example through a traction control system. Alternatively, or in addition, the timing of changes in the target off-road ride height and/or the rate of change can be varied based on the vehicle speed.

The control system can be configured to receive a transmission signal indicating the current transmission operating range; and/or to receive a transfer case signal indicating the current transfer case operating range (for example, a high range or a low range). The control system can select the target off-road ride height of said vehicle in dependence on the selected transmission operating range and/or the selected transfer case operating range. The target off-road ride height can, for example, be varied based on the selected transfer case operating range. The target off-road ride height could, for example, be increased when the transfer case is operating in a low range. Alternatively, or in addition, the timing of changes in the target off-road ride height and/or the rate of change can be varied based on the selected transfer case operating range. For example, a shorter time interval can be measured before a change in the target off-road ride height is implemented if the transfer case is operating in a low range than if the transfer case is operating in a high range.

The control system could be configured to provide substantially continuous control of the target off-road ride height of the vehicle. Alternatively, the control system can be configured to select one of a plurality of predefined target off-road ride heights in dependence on said one or more vehicle operating parameters. When the vehicle speed is below a first speed threshold, the control system can be configured to select a first of said target off-road ride heights. The control system can be configured to select a second of said target off-road ride heights when the vehicle speed is above said first speed threshold. The first off-road ride height can be higher than the second off-road ride height. The control system can output a suspension control signal to adjust the height of one or more suspension units to achieve the first or second target off-road ride height.

The control system can be configured automatically to select the first of said target off-road ride heights when the vehicle speed decreases below said first speed threshold. The control system can be configured automatically to select the first of said target off-road ride heights only once the vehicle speed has remained below said first speed threshold for a defined first time period. The time interval can be varied depending on the transfer case operating mode. For example, the first time interval can be shorter when the transfer case is in a low range than when it is in a high range. The control system can be configured to enable manual selection of said first off-road ride height when the second off-road ride height is selected provided the vehicle speed is less than a predefined threshold.

The control system can be configured to select said second off-road ride height provided the vehicle speed remains below a second speed threshold. The second speed threshold can be higher than the first speed threshold. A target on-road ride height can be defined for when the vehicle is travelling on a uniform surface, such as a metaled road. The control system can be configured to select the target on-road ride height when the vehicle speed increases above the second speed threshold. The control system can be configured automatically to select the second target off-road ride height once the vehicle speed has remained below said second speed threshold for a defined second time period.

The control system can be configured automatically to output an inhibit signal to inhibit said off-road driving mode when the vehicle speed exceeds the second speed threshold for a third predefined time period. The control system could optionally be configured to output an activate signal to engage the off-road driving mode if the vehicle speed decreases below the first speed threshold or the second speed threshold for a fourth defined time period.

The driving mode signal can be output from a driving mode selector. The driving mode selector can be integrated into the control system. The driving mode selector could be operated manually, for example by operating a rotary dial or a touchscreen. Alternatively, the driving mode selector could be operated automatically, for example in dependence on a detected terrain parameter. The control system can be configured to select one of said predefined target off-road ride heights in dependence on one or more detected terrain parameters. The terrain parameter could, for example, be representative of a particular terrain type, such as sand, grass, rocks, mud and so on.

According to a still further aspect of the present invention there is provided a control system for controlling a target ride height of a vehicle, the control system being configured to implement an automated ride height control to increase the target ride height of the vehicle when the vehicle speed falls below one or more predefined thresholds. The control system can be configured to implement said automated ride height control when the vehicle is in an off-road driving mode. The control system can increase the target ride height only once the vehicle speed has been below said one or more predefined thresholds for a predefined time period. The control system can be configured to receive a transfer case signal to indicate an operating range of a transfer case. The control system can be configured to increase the target ride height only when the transfer case signal indicates that the transfer case is operating in a low range.

The control system could be configured to provide substantially continuous control of the target off-road ride height of the vehicle. Alternatively, the control system can be configured to select one of a plurality of predefined target off-road ride heights corresponding to respective vehicle speed thresholds. When the vehicle speed is below a first speed threshold, the control system can be configured to select a first of said target off-road ride heights. The control system can be configured to select a second of said target off-road ride heights when the vehicle speed is above said first speed threshold. The second speed threshold can be higher than the first speed threshold. The first off-road ride height can be higher than the second off-road ride height.

According to a yet further aspect of the present invention there is provided a vehicle comprising a control system as described herein. The vehicle can be adapted for driving off-road, for example having four-wheel drive and a transfer case operable to engage high and low ranges. A suspension unit is typically associated with each wheel. The height of some or all of the suspension units can be adjustable, for example two or four of the suspension units can be adjustable. The suspension units can be adjusted together, individually or in pairs. At least in certain embodiments, the suspension units can be adjusted independently of each other.

According to a further aspect of the present invention there is provided a method of controlling a target ride height of a vehicle, the method comprising:

receiving a driving mode signal signalling that an off-road driving mode has been selected; and, upon receipt of the driving mode signal, setting a target off-road ride height in dependence on one or more vehicle operating parameters.

According to a still further aspect of the present invention there is provided a method of controlling a target ride height of a vehicle, the method comprising:

increasing the target ride height of the vehicle when the vehicle speed falls below one or more predefined thresholds. The method can comprise increasing the target ride height only once the vehicle speed has been below said one or more predefined thresholds for a predefined time period. The time period can be varied depending on an operating range of a transfer case. A first time period can be applied if the transfer case is operating in a low range; and a second time period can be applied if the transfer case is operating in a high range. The first time period can be shorter than the second time period.

The control system described herein can comprise a control unit or computational device having one or more electronic processors. The system may comprise a single control unit or electronic controller or alternatively different functions of the control system may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying figures, in which.

DETAILED DESCRIPTION OF AN EMBODIMENT

Figure 1:
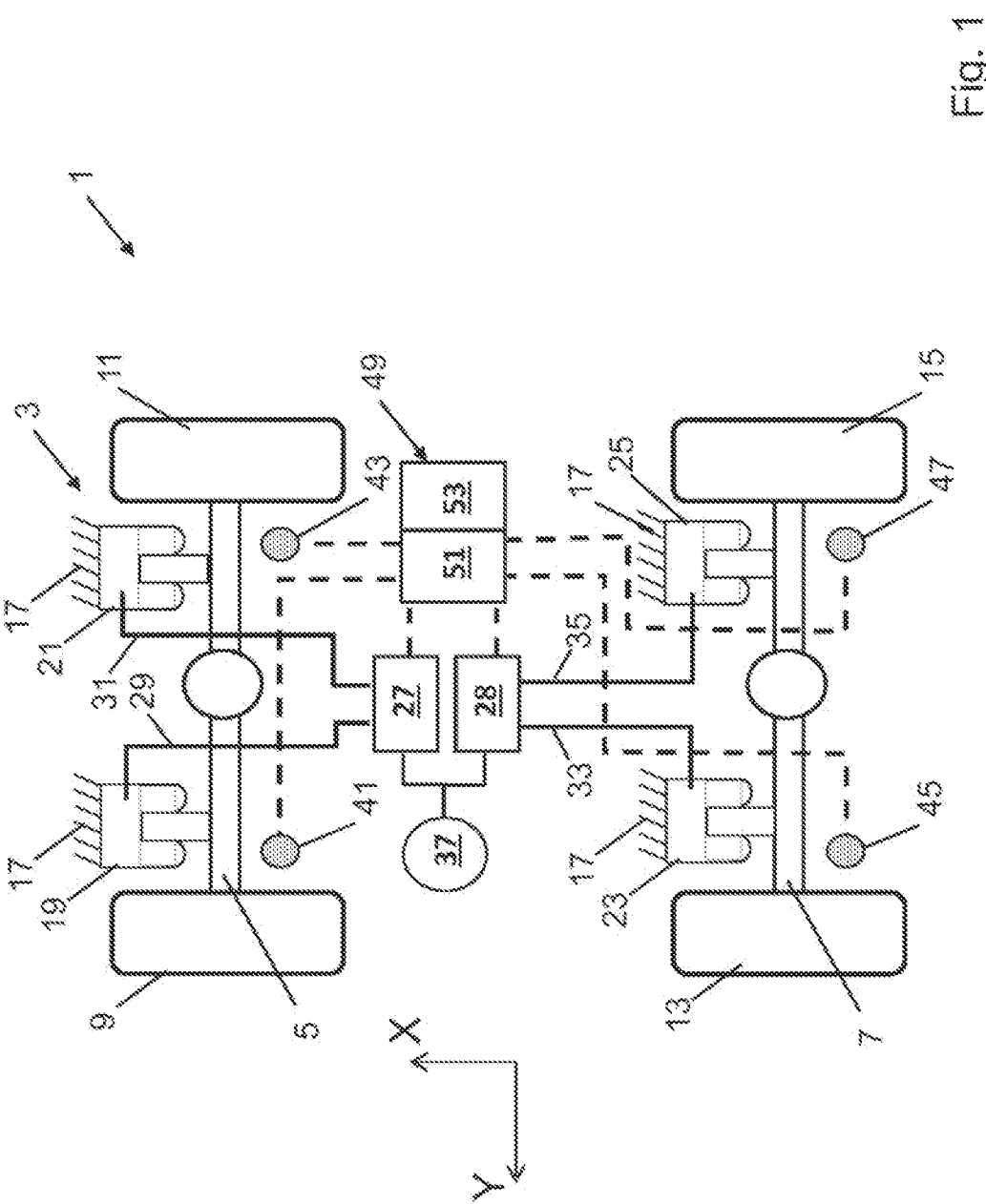
FIG. 1 shows a schematic representation of a motor vehicle suspension system in accordance with an embodiment of the present invention.

A vehicle 1 having an adjustable height suspension system 3 in accordance with the present invention is illustrated in FIG. 1. The vehicle 1 is a four-wheel drive vehicle capable of driving off-road.

The vehicle 1 has a front axle 5 and a rear axle 7, both representing unsprung parts of the vehicle 1. The front axle 5 carries front wheels 9, 11; and the rear axle 7 carries rear wheels 13, 15. A sprung part of the vehicle 1, represented diagrammatically as a body or chassis 17 (see FIG. 2), has its weight supported by front air spring suspension units 19, 21 and rear air spring suspension units 23, 25.

The air spring suspension units 19, 21, 23, 25 are connected to respective front and rear valve blocks 27, 28 through individual pipes 29, 31, 33, 35. The valve blocks 27, 28 are connected to a motor driven compressor 37 through a regenerative dryer. The first and second valve block 27, 28 each comprise a valve array (not shown) which can operatively connect each air spring suspension unit 19, 21, 23, 25 to the compressor 37 or to an exhaust to atmosphere 39; or can isolate each air spring suspension unit 19, 21, 23, 25 to maintain the mass of air within constant. Thus, the valve blocks 27, 28 enable independent control of the air pressure in each of the air spring suspension units 19, 21, 23, 25.

The air spring suspension units 19, 21, 23, 25 have respective height sensors 41, 43, 45, 47 for measuring a ride height of the body 17 relative to the associated wheel 9, 11, 13, 15. Thus, the height sensors 41, 43, 45, 47 measure the height of the sprung components relative to the unsprung components. The height sensors 41, 43, 45, 47 can be a rotary Hall-effect transducer or a rotary potentiometer, for example. The height sensors 41, 43, 45, 47 are connected to an electronic control unit (ECU) 49 to provide suspension height signals. The ECU 49 is also connected to a vehicle communication bus (not shown) to receive data relating to vehicle operating parameters, such as the vehicle speed derived from wheel velocity transducers and the currently selected operating range of a transfer case (not shown).

Figure 2A:
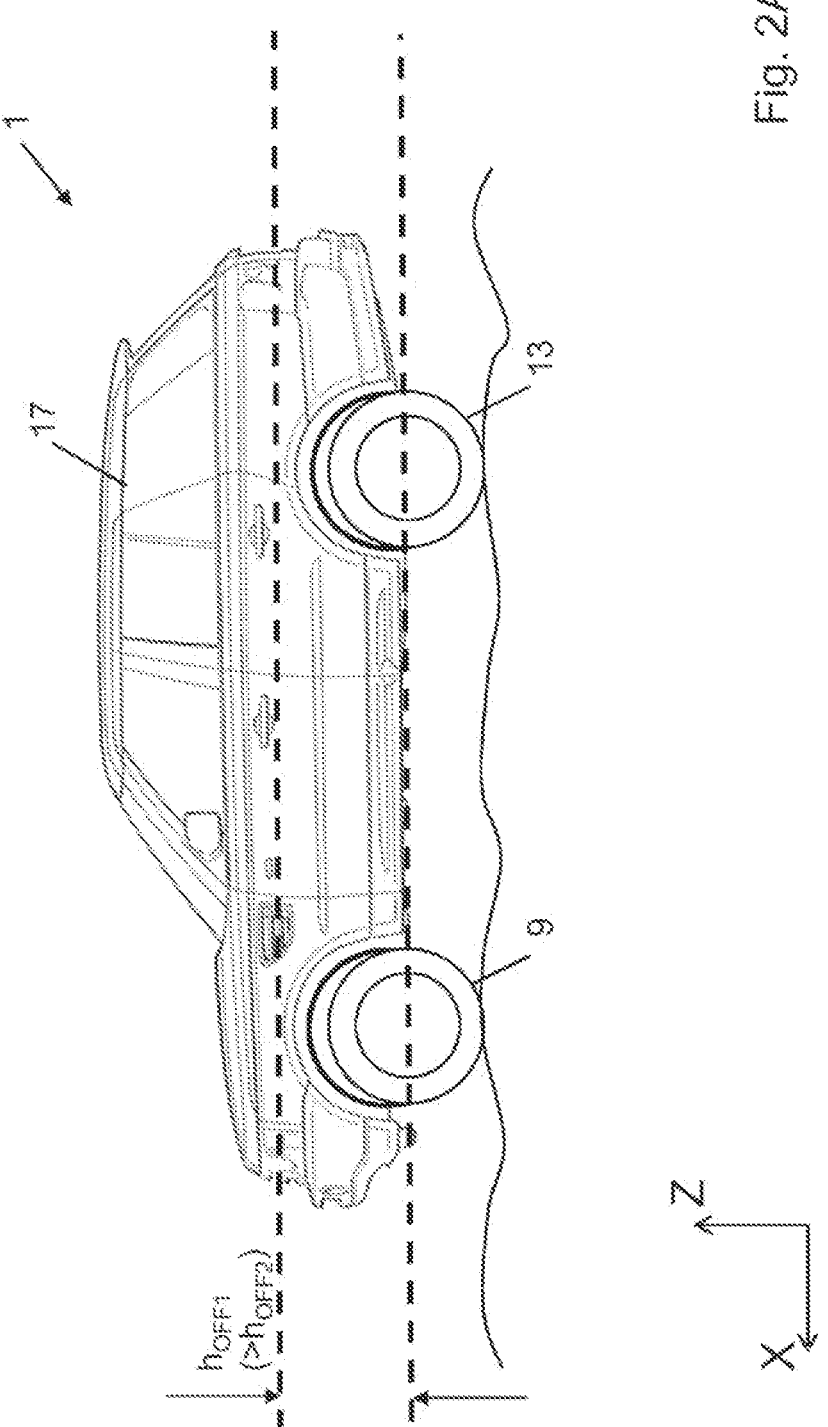
FIGS. 2A, 2B and 2C show a side elevation of the motor vehicle at respective first, second and third ride heights.

The ECU 49 comprises a control unit 51 for controlling the ride height of the vehicle 1. The control unit 51 outputs suspension control signals to the valve blocks 27, 28 to provide independent control of the mass of air in each of the air spring suspension units 19, 21, 23, 25. The ECU 49 can thereby independently control the height of each air spring suspension unit 19, 21, 23, 25. In normal use, the ECU 49 is configured to operate in a self-levelling mode to maintain the height of each air spring suspension unit 19, 21, 23, 25 to maintain the body 17 at a control target ride height. This operating mode is illustrated in FIG. 2A when the vehicle 1 is on level ground. If the ECU 49 determines that the height of an air spring suspension unit 19, 21, 23, 25 is too low to maintain the control target ride height, the valve blocks 27, 28 are operated to increase the air mass in that air spring suspension unit 19, 21, 23, 25 to increase its height. Conversely, if the ECU 49 determines that the height of an air spring suspension unit 19, 21, 23, 25 is too low to achieve the control target ride height, the valve block 27 is operated to reduce the air mass in that air spring suspension unit 19, 21, 23, 25 to reduce its height. The ECU 49 operates to maintain the ride height of the body 17 at the control target ride height or within a predefined range. The control unit may comprise a single control unit or electronic controller or alternatively different functions of the control system may be embodied in, or hosted in, different physical controllers. As used herein the term "control unit", "electronic control unit" or "ECU" will be understood to include both a single control unit or controller, and a plurality of control units or controllers collectively operating to provide the stated control functionality.

A drive mode selector 53 is provided to select either an on-road driving mode or an off-road driving mode. The drive mode selector 53 outputs a driving mode signal to the control unit 51 to indicate whether the on-road or off-road driving mode is currently selected. When the on-road driving mode is active, the control unit 51 configures the vehicle 1 for driving on a metaled road typically having a uniform surface. When the off-road driving mode is active, the control unit 51 configures the vehicle 1 for driving off-road on a surface which may be irregular. In the present embodiment, when the off-road driving mode is selected, the control unit 51 increases the control target ride height of the body 17 to provide improved ground clearance. The control unit 51 controls the first and second valve blocks 27, 28 to increase the air mass in the air spring suspension units 19, 21, 23, 25 and increase the height of each suspension unit. It will be appreciated that the off-road driving mode can implement other functions (for example to alter throttle response and/or the weighting of the steering) but these are outside the scope of the present application. The operation of the drive mode selector 53 is performed manually, for example by operating a switch or knob. In alternate embodiments, the drive mode selector 53 could be operated automatically, for example as a function of the ECU 49. A suitable technique for automatically selecting the off-road driving mode is known from the Applicant's co-pending patent application GB2492655 filed on 4 Jul. 2012, the contents of which are incorporated herein in their entirety by reference.

The control unit 51 controls the first and second valve blocks 27, 28 to maintain the ride height of the vehicle 1 at a predefined on-road target ride height ($h_{ON}$) when the on-road driving mode is selected. The control unit 51 defines a first target off-road ride height ($h_{OFF1}$) and a second target off-road ride height ($h_{OFF2}$) for selection automatically when the off-road driving mode is selected. The first target off-road ride height ($h_{OFF1}$) is higher than the second target off-road ride height ($h_{OFF2}$). In the present embodiment the first target off-road ride height ($h_{OFF1}$) is approximately 75 mm and the second target off-road ride height ($h_{OFF2}$) is approximately 40 mm. The target off-road heights ($h_{OFF1}$, $h_{OFF2}$) can be calibrated for different vehicles, for example the first target off-road ride height ($h_{OFF1}$) can be reduced to 65 mm and the second target off-road ride height ($h_{OFF2}$) reduced to 35 mm.

When the off-road driving mode is selected, the control unit 51 is configured automatically to select one of said first and second target off-road ride heights ($h_{OFF1}$, $h_{OFF2}$) based on an operating parameter of the vehicle. In particular, the control unit 51 selects either the first or second target off-road ride heights ($h_{OFF1}$, $h_{OFF2}$) in dependence on the vehicle speed. The control unit 51 defines first and second speed thresholds, the first speed threshold being less than the second speed threshold. In the present embodiment, the first speed threshold is 50 km/h and the second speed threshold is 80 km/h. The control unit 51 is configured to calibrate hysteresis into the first and second speed thresholds for selecting ride heights and for automatically dropping out of those ride heights. The first target off-road ride height ($h_{OFF1}$) is selected up to 40 kph and is automatically cancelled, transitioning to the second target off-road ride height ($h_{OFF2}$), when the speed exceeds 50 kph. The second target off-road ride height ($h_{OFF2}$) is selected up to 70 kph and is automatically cancelled, transitioning to a standard on-road target ride height, when the speed exceeds 80 kph.

When the off-road driving mode is selected and the vehicle speed is less than the first speed threshold, the control unit 51 is configured to select the first target off-road ride height ($h_{OFF1}$). The control unit 51 outputs control signals to the suspension units 19, 21, 23, 25 to adjust the suspension height to match the first target off-road ride height ($h_{OFF1}$), as shown in FIG. 2*a*.

Figure 2B:
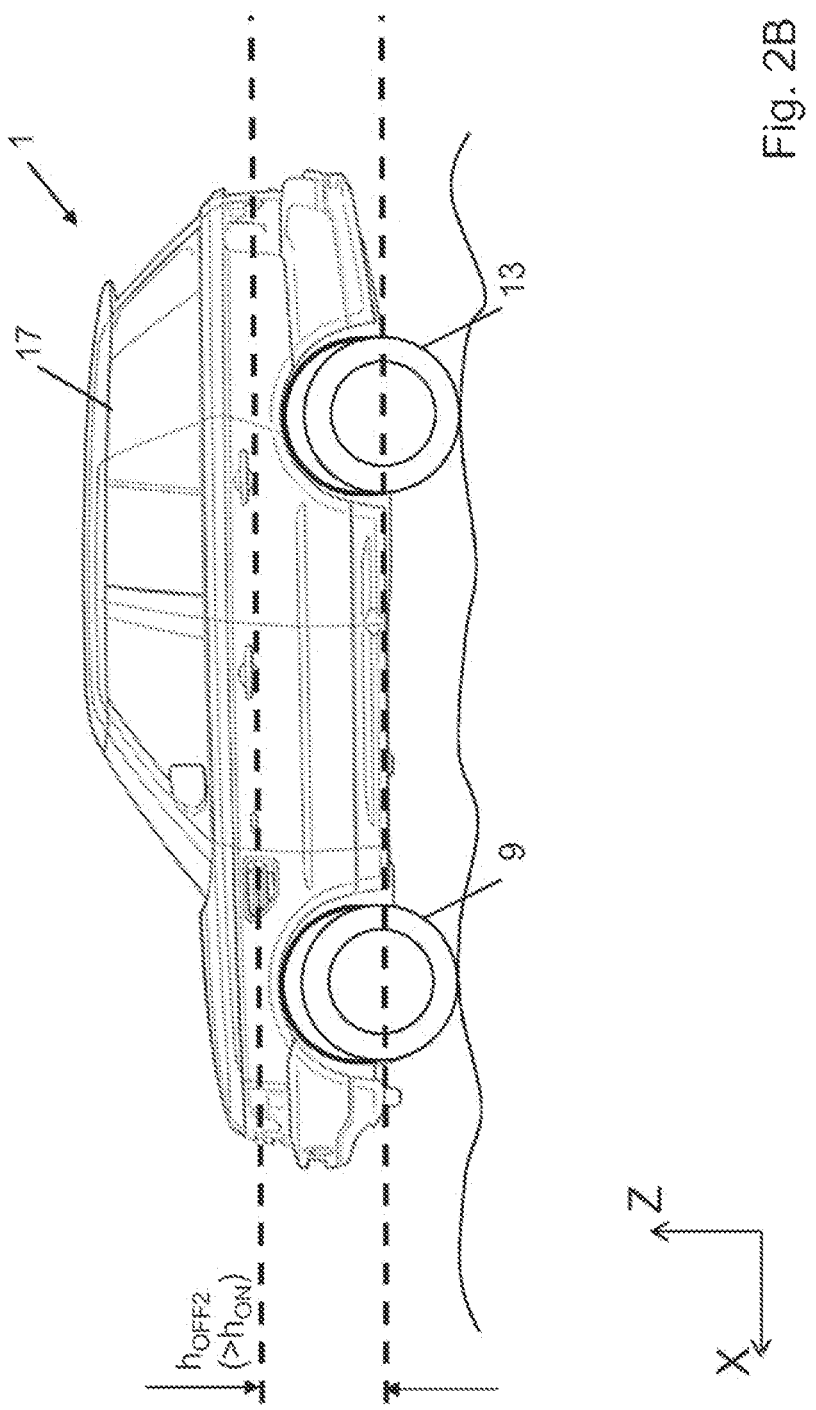

When the off-road driving mode is selected and the vehicle speed is between the first and second speed thresholds, the control unit 51 is configured to select the second target off-road ride height ($h_{OFF2}$). The control unit 51 outputs control signals to the suspension units 19, 21, 23, 25 to adjust the suspension height to match the second target off-road ride height ($h_{OFF2}$), as shown in FIG. 2*b*.

Figure 2C:
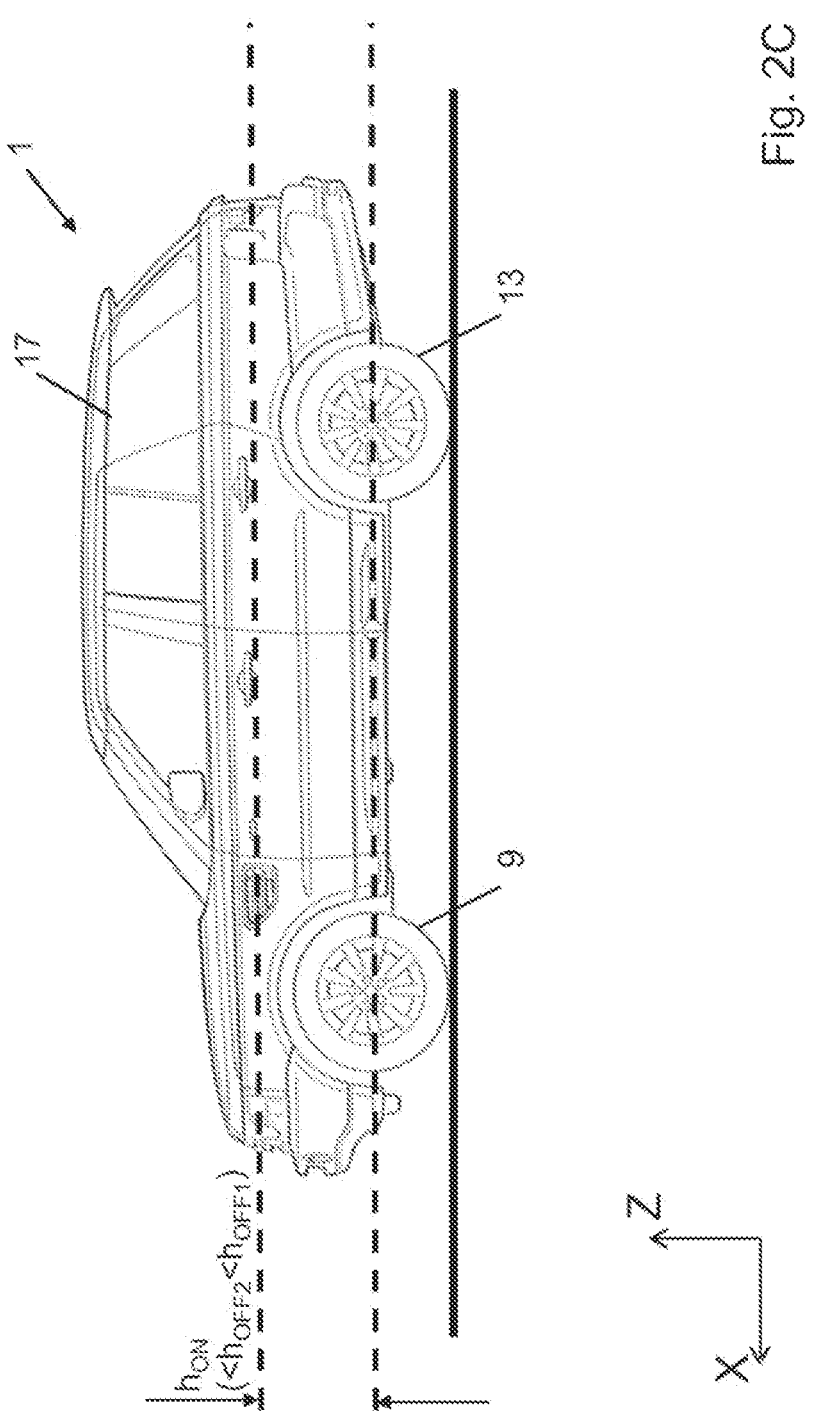

If the vehicle speed increases above the second speed threshold, the control unit 51 is configured to select the target on-road ride height ($h_{ON}$). The control unit 51 outputs control signals to the suspension units 19, 21, 23, 25 to adjust the suspension height to match the target on-road ride height ($h_{ON}$), as shown in FIG. 2*c*. The drive mode selector 53 can optionally be configured to dis-engage the off-road drive mode if the vehicle speed exceeds the second speed threshold.

The control unit 51 is further configured automatically to select the first target off-road ride height ($h_{OFF1}$) in dependence on the vehicle speed and optionally also the selected transfer case range. Specifically, if the vehicle speed is below a third speed threshold (typically lower than the first speed threshold) for a predefined first time period, the first target off-road ride height ($h_{OFF1}$) is selected. In the present embodiment the third speed threshold is 40 km/h. The first time period which must elapse before selection occurs depends on the selected transfer case range. If the transfer case is operating in a low range, a second time period is implemented; and, if the transfer case is operating in a high range, a third time period is implemented. The second time period is less than the third time period. In the present embodiment the second time period is thirty (30) seconds and the third time period is five (5) minutes.

If, when the vehicle speed is below the third speed threshold, the vehicle comes to a standstill the timer measuring said first time period can optionally be stopped, zeroed and re-started when the car moves off. Alternatively, the timer could be paused when the vehicle comes to rest and re-started when the car moves off. However, setting the timer to zero can help to reduce the number of ride height changes, for example to avoid unnecessary ride height changes when the vehicle has temporarily come to a standstill.

A further refinement is to enable selection of the first off-road ride height ($h_{OFF1}$) by manually requesting an air suspension raise function when the second off-road ride height ($h_{OFF2}$) is engaged. The requested air suspension function can be permitted provided the vehicle speed is less than a predefined threshold, such as 40 km/h.

Optionally, if the vehicle speed is below a fourth speed threshold (which is less than the third speed threshold) for a fourth time period (which is less than the second time period), the first target off-road ride height ($h_{OFF1}$) is selected. In the present embodiment the fourth speed threshold is 10 km/h and the fourth time interval is fifteen (15) seconds.

It will be understood that the time periods and speed thresholds described herein can be calibrated for particular applications or vehicles.

The present embodiment has been described with reference to a target vehicle ride height (h) and a suspension unit height. These heights are both defined in relation to respective reference points, which can be coincident with, or offset from each other. The suspension height can be the same as the target vehicle ride height. Alternatively, the control unit 51 can map the target vehicle ride height to a corresponding suspension height. For example, the control unit 51 can determine the required suspension height to achieve a target ride height. The control unit 51 can calculate the required suspension height or access a look-up table to identify the required suspension height. A dynamic model can be implemented to calculate the suspension heights for the current ride height given the vehicle's operating conditions.

An automated drive mode selector 53 can be implemented (for example as described in the Applicant's co-pending application GB2492655) to provide automatic selection of said first target off-road ride height ($h_{OFF1}$). The automated selection of the first target off-road ride height ($h_{OFF1}$) can be dependent on the transfer case operating in a low range. The automated drive mode selector 53 can optionally be by-passed, for example when the off-road driving mode is selected manually.

It will be appreciated that various changes and modifications can be made to the embodiment described herein without departing from the present invention. Further aspects of the present invention are set out in the following numbered paragraphs, in any of which the control system may comprise a control unit:

1. A control system for controlling a target ride height of a vehicle, the control system being configured, upon receipt of a driving mode signal signalling that an off-road driving mode has been selected, automatically to set a target off-road ride height in dependence on one or more vehicle operating parameters.
2. A control system as described in paragraph 1, wherein the vehicle operating parameters comprise a vehicle speed and/or a transfer case operating range.
3. A control system as described in paragraph 2 configured to select one of a plurality of predefined target off-road ride heights in dependence on said one or more vehicle operating parameters.
4. A control system as described in paragraph 3 configured to select a first of said target off-road ride heights when the vehicle speed is below a first speed threshold.
5. A control system as described in paragraph 4 configured to select a second of said target off-road ride heights when the vehicle speed increases above said first speed threshold.
6. A control system as described in paragraph 5, wherein said first off-road ride height is higher than said second off-road ride height.
7. A control system as described in paragraph 5 configured automatically to select the first of said target off-road ride heights when the vehicle speed decreases below said first speed threshold for a defined first time period.
8. A control system as described in paragraph 7, wherein the first time period is dependent on the transfer case operating range.

9. A control system as described in paragraph 5 configured to select a target on-road ride height when the vehicle speed increases above a second speed threshold.

10. A control system as described in paragraph 9 configured automatically to select the first or second target off-road ride height once the vehicle speed has decreased below said second speed threshold for a defined second time period.

11. A control system as described in paragraph 9 configured to output a signal to dis-engage the off-road driving mode when the vehicle speed remains above said second speed threshold for a defined third time period.

12. A control system as described in paragraph 5 configured to enable manual selection of said first off-road ride height when the second off-road ride height is selected and the vehicle speed is less than a predefined threshold.

13. A control system as described in paragraph 1 configured to set the target off-road ride heights in dependence on a detected terrain parameter.

14. A control system for controlling a target ride height of a vehicle, the control system being configured to implement an automated ride height control to increase the target ride height of the vehicle when the vehicle speed falls below one or more predefined thresholds.

15. A control system as described in paragraph 14 configured to implement said automated ride height control when the vehicle is in an off-road driving mode.

16. A control system as described in paragraph 14 configured to increase the target ride height only once the vehicle speed has been below said one or more predefined thresholds for a predefined time period.

17. A vehicle comprising a control system as described in any one of the preceding paragraphs 1-16.

18. A method of controlling a target ride height of a vehicle, the method comprising:

receiving a driving mode signal signalling that an off-road driving mode has been selected; and, upon receipt of the driving mode signal, setting a target off-road ride height in dependence on one or more vehicle operating parameters.

19. A method of controlling a target ride height of a vehicle, the method comprising:

increasing the target ride height of the vehicle when the vehicle speed falls below one or more predefined thresholds.

The invention claimed is:

1. A control system for controlling a target ride height of a vehicle, the control system comprising an electronic control unit (ECU) configured to receive a driving mode signal signaling that an off-road driving mode has been selected, wherein when in said selected off-road driving mode, the control system is configured to select a first target off-road ride height when the vehicle speed is below a first speed threshold and to select a second target off-road ride height when the vehicle speed is above said first speed threshold, wherein said first target off-road ride height is higher than said second target off-road ride height, and wherein the control system is configured to select a target ride height lower than the second target off-road ride height when the vehicle speed increases above a second speed threshold.

2. A control system as claimed in claim 1, configured automatically to select the first of said target off-road ride heights when the vehicle speed decreases below said first speed threshold for a defined first time period.

3. A control system as claimed in claim 2, wherein the first time period is dependent on a transfer case operating range.

4. A control system as claimed in claim 1, configured automatically to select the first or second target off-road ride height once the vehicle speed has decreased below said second speed threshold for a defined second time period.

5. A control system as claimed in claim 1, configured to output a signal to dis-engage the off-road driving mode when the vehicle speed remains above said second speed threshold for a defined third time period.

6. A control system as claimed in claim 1, configured to enable manual selection of said first off-road ride height when the second off-road ride height is selected and the vehicle speed is less than a predefined threshold.

7. A control system as claimed in claim 1, configured to set the target off-road ride heights in dependence on a detected terrain parameter.

8. A control system as claimed in claim 1, wherein the control system comprises a driving mode selector configured to output the driving mode signal, the driving mode selector being operable manually by a driver or automatically in relation to automatically detected terrain parameters to signal that an on-road or an off-road driving mode has been selected.

9. A vehicle comprising a control system as claimed in claim 1.

10. A method of controlling a target ride height of a vehicle, the method comprising receiving a driving mode signal signaling that an off-road driving mode has been selected, wherein when in said selected off-road driving mode, the method comprises:

selecting a first target off-road ride height when the vehicle speed is below a first speed threshold; and
selecting a second target off-road ride height when the vehicle speed is above said first speed threshold, wherein said first target off-road ride height is higher than said second target off-road ride height, and
wherein the method comprises selecting a target ride height lower than the second target off-road ride height when the vehicle speed increases above a second speed threshold.

11. A method as claimed in claim 10, comprising automatically selecting the first of said target off-road ride heights when the vehicle speed decreases below said first speed threshold for a defined first time period.

12. A method as claimed in claim 11, wherein the first time period is dependent on a transfer case operating range.

13. A method as claimed in claim 10, comprising automatically selecting the first or second target off-road ride height once the vehicle speed has decreased below said second speed threshold for a defined second time period.

14. A method as claimed in claim 10, comprising outputting a signal to dis-engage the off-road driving mode when the vehicle speed remains above said second speed threshold for a defined third time period.

15. A method as claimed in claim 10, comprising enabling manual selection of said first off-road ride height when the second off-road ride height is selected and the vehicle speed is less than a predefined threshold.

16. A method as claimed in claim 10, comprising setting the target off-road ride heights in dependence on a detected terrain parameter.

17. A non-transitory, computer-readable storage medium storing instructions thereon that, when executed by one or more electronic processors, causes the one or more electronic processors to carry out the method of claim 10.

\* \* \* \* \*